March 29, 1966  M. W. CARROLL ETAL  3,242,520
WINDSHIELD WIPER MECHANISM

Filed Nov. 10, 1964  6 Sheets-Sheet 1

INVENTORS:
MICHAEL W. CARROLL,
JAMES C. KERRIGAN.
BY
Souther, Stollenberg & Barr
ATTYS.

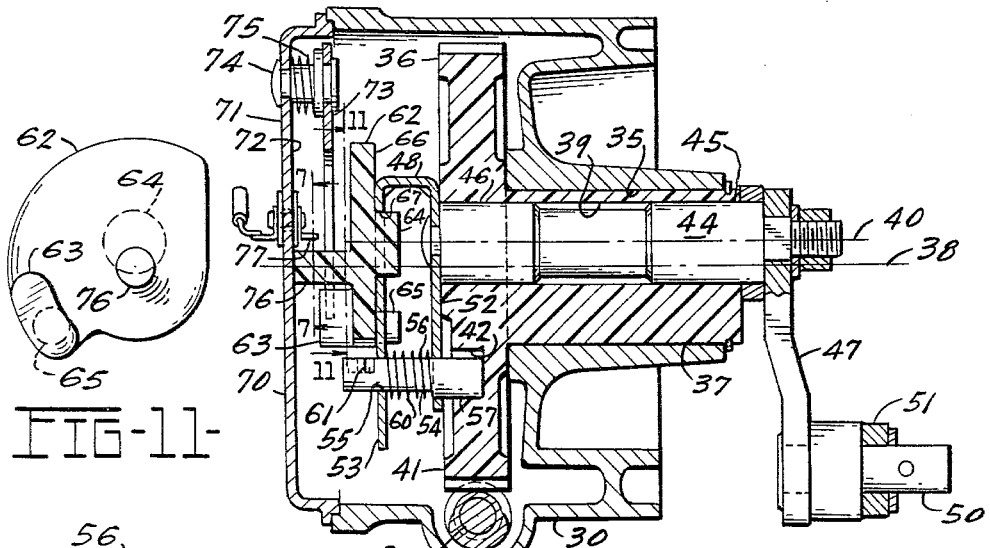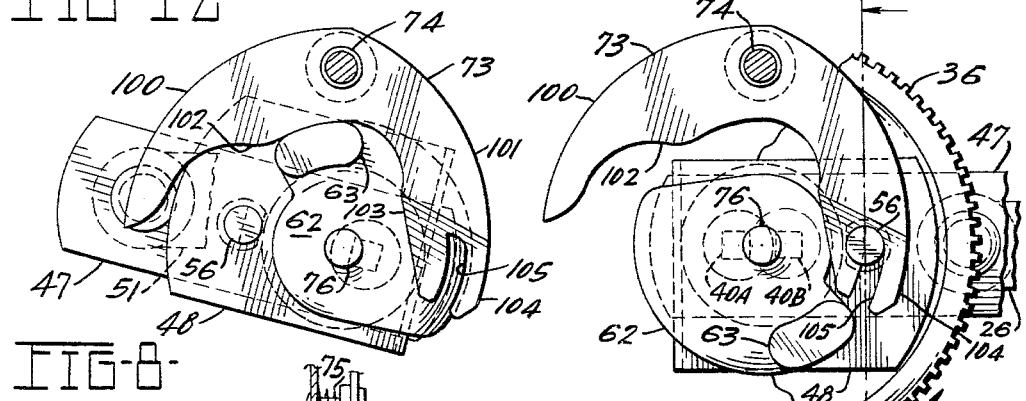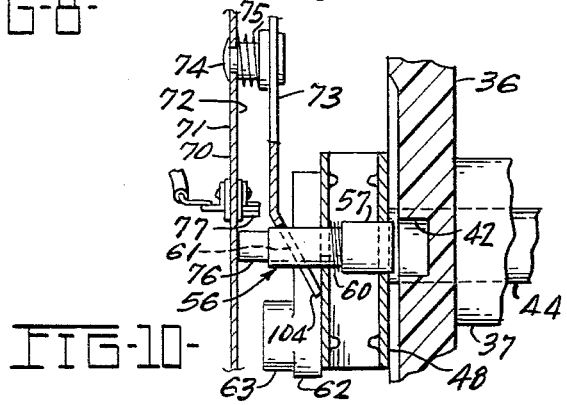

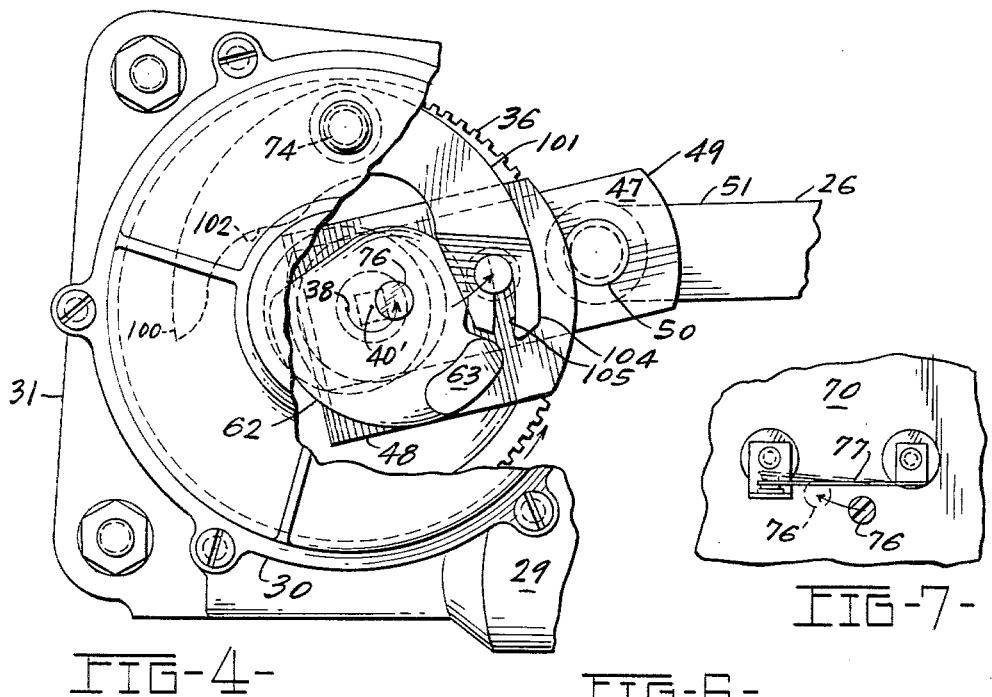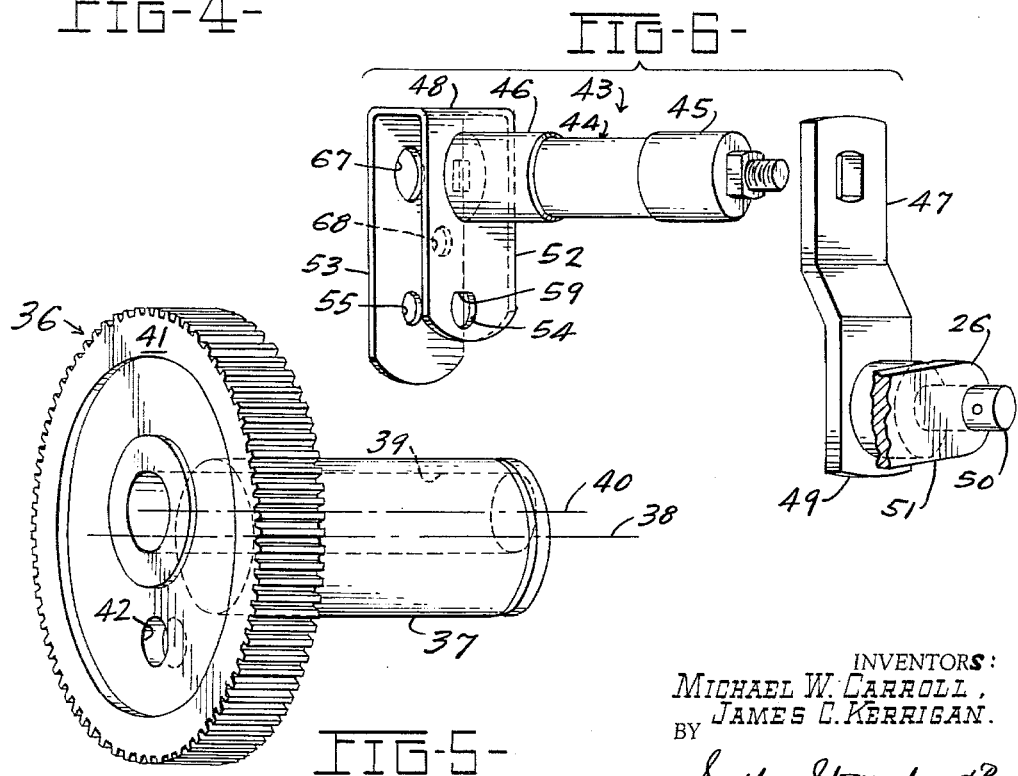

March 29, 1966  M. W. CARROLL ETAL  3,242,520
WINDSHIELD WIPER MECHANISM
Filed Nov. 10, 1964  6 Sheets-Sheet 4
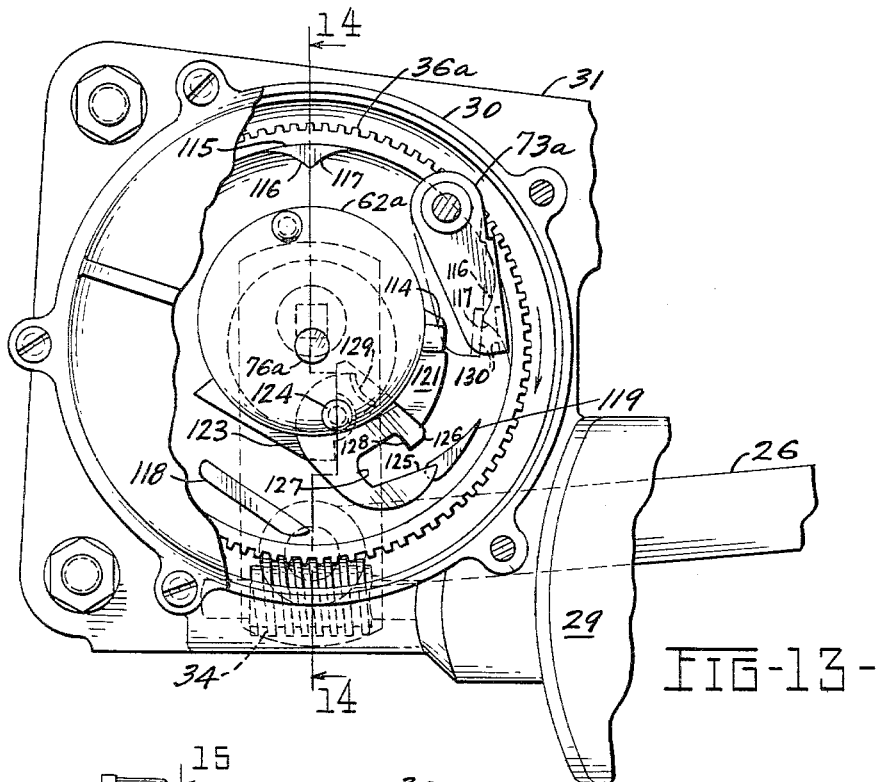
FIG-13-
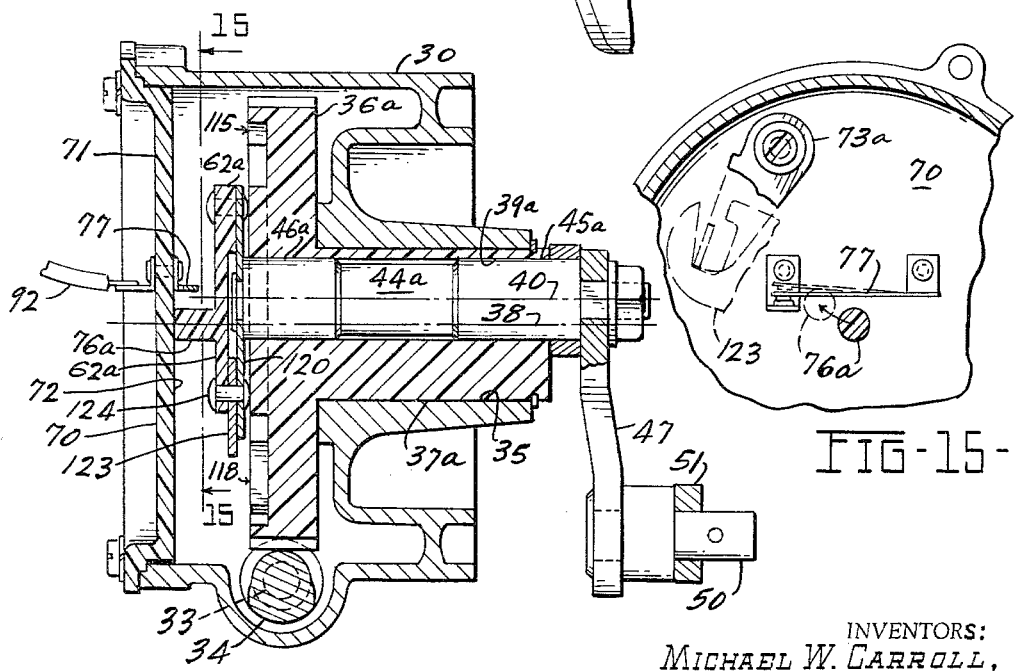
FIG-14-
FIG-15-
INVENTORS:
MICHAEL W. CARROLL,
JAMES C. KERRIGAN.
BY
Souther, Stottenberg & Barr
ATTYS.

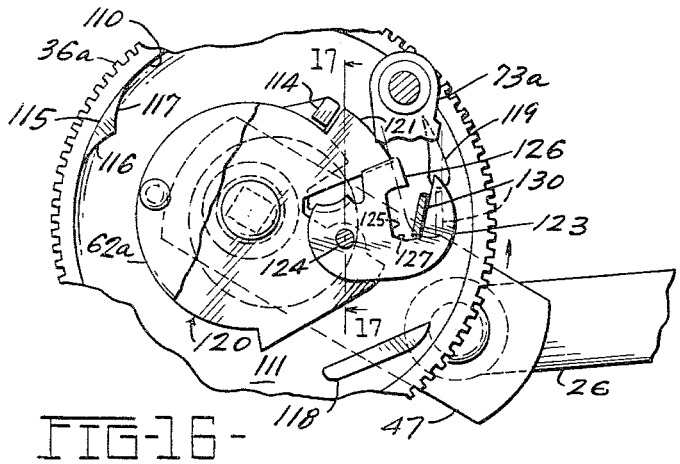
FIG-16-
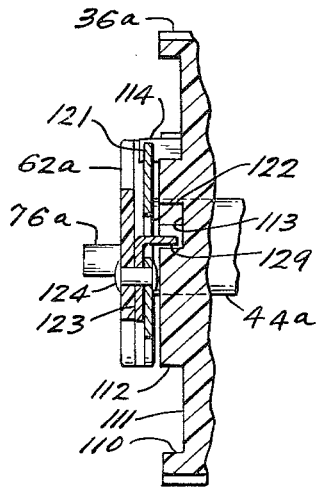
FIG-17-
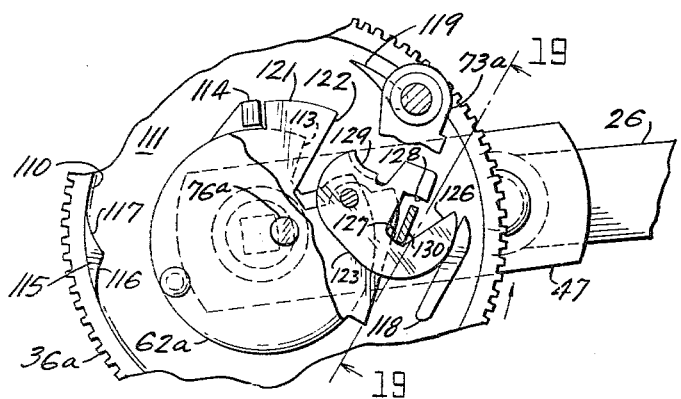
FIG-18-
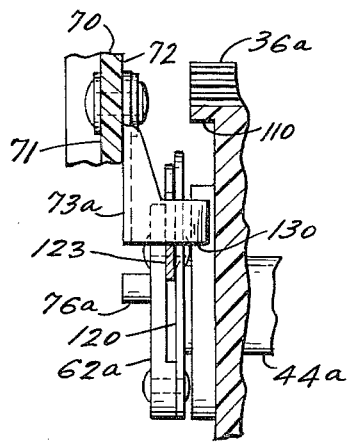
FIG-19-
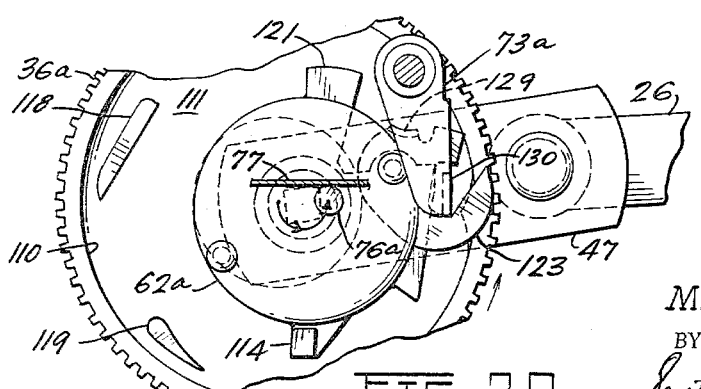
FIG-20-
INVENTORS:
MICHAEL W. CARROLL,
JAMES C. KERRIGAN.
BY Souther, Stoltenberg & Barr
ATT'YS.

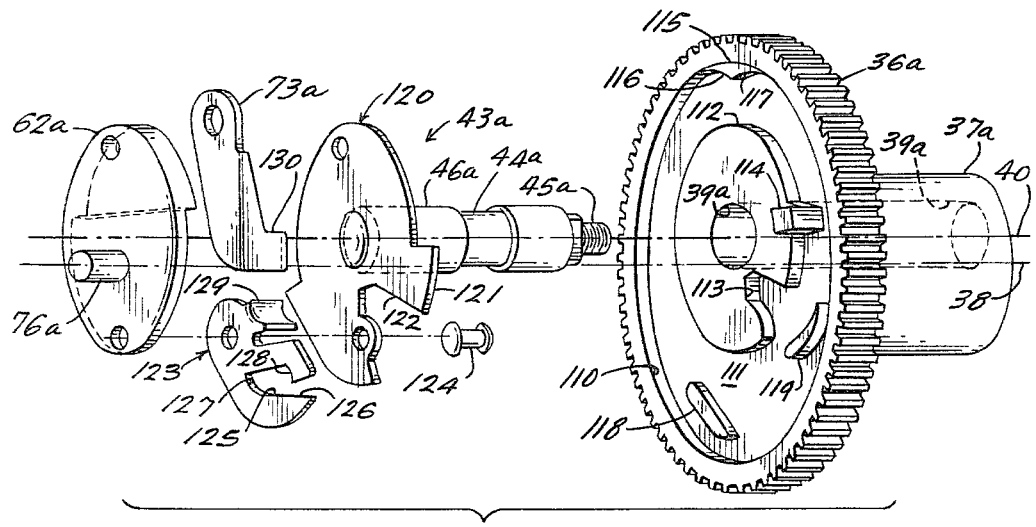
FIG-21-
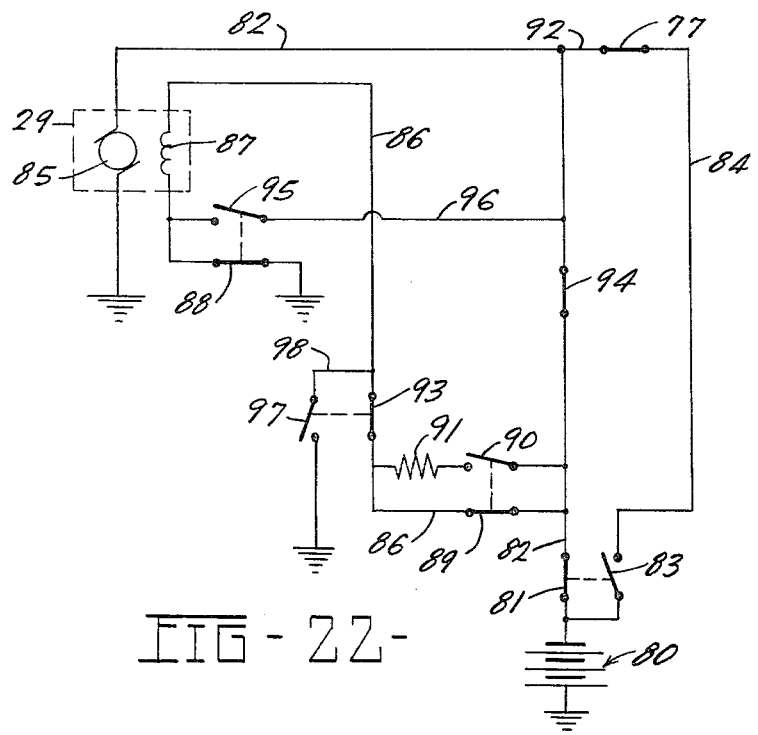
FIG-22-

United States Patent Office 3,242,520
Patented Mar. 29, 1966

3,242,520
WINDSHIELD WIPER MECHANISM
Michael W. Carroll, Kirkville, N.Y., and James C. Kerrigan, Milwaukee, Wis., assignors to Eltra Corporation, Brooklyn, N.Y., a corporation of New York
Filed Nov. 10, 1964, Ser. No. 410,178
9 Claims. (Cl. 15—250.17)

This invention relates to a windshield wiper mechanism and more particularly, to a variable throw drive mechanism for windshield wipers.

A modern windshield wiper drive mechanism functions to oscillate a wiper blade over a predetermined sector of a vehicle windshield. The blade is pivotally mounted below the bottom edge of the windshield and usually has a crank arm that is connected to the drive mechanism by a link. When the operator turns "Off" the windshield wiper such a mechanism must also function to move the wiper blade to a "Park" position which is beyond the normal wiping sector and usually is adjacent the bottom edge of the windshield.

It is the primary object of the instant invention to provide an improved windshield wiper drive mechanism which automatically moves the wiper blade to a "Park" position when a vehicle operator turns the windshield wiper switch to "Off" position.

It is a further object of the instant invention to provide a windshield wiper drive mechanism which insures a proper sequence of operational steps, such that an extra revolution of the wiper is provided to remove the streak left by conventional wiper mechanisms.

It is a still further object of the instant invention to provide a windshield wiper drive mechanism comprising a rotary drive means and a crank having a positive locking system which need not rely upon or be effected by inertia and frictional forces of the wiper blade connecting assembly to hold the drive means and the crank in their desired relationships.

Other objects of this invention will become apparent from the following specification and drawings in which:

FIG. 3 is a vertical, sectional view taken along the line 3—3 of FIG. 2;

FIG. 4 is a fragmentary front elevational view similar to FIGURE 2 and with part of the cover plate broken away and showing the windshield wiper drive mechanism in a "Park" position;

FIG. 5 is a perspective view, shown on an enlarged scale, of a rotatable member and indicating both its fixed axis of rotation and an eccentric axis of a bore for the crank mechanism;

FIG. 6 is an exploded view in perspective showing the crank mechanism;

FIG. 7 is a fragmentary view in elevation taken along the line 7—7 of FIG. 3;

FIG. 8 is a detailed view in front elevation of parts of the windshield wiper drive mechanism and showing in particular the relationship between the component parts when the drive means is operating in a reverse direction;

FIG. 9 is a view similar to FIG. 8 and showing the means for disengaging the crank mechanism from a rotatable member of the drive means;

FIG. 10 is a fragmentary, vertical sectional view taken along the line 10—10 of FIG. 9;

FIG. 11 is a detail view in elevation taken from the position indicated by the line 11—11 in FIG. 3;

FIG. 12 is a detail plan view of a pin for releasably connecting the rotatable member to the crank mechanism;

FIG. 13 is a view similar to FIG. 2, showing a second embodiment of a windshield wiper drive mechanism according to the instant invention;

FIG. 14 is a fragmentary vertical, sectional view taken along the line 14—14 of FIG. 13;

FIG. 15 is a fragmentary, vertical sectional view, taken along the line 15—15 of FIG. 14;

FIG. 16 is a fragmentary, front elevational view, with parts removed, of the embodiment of the invention, illustrated in FIG. 13 and showing, in particular, the component parts when the drive means begins to operate in a reverse direction;

FIG. 17 is a fragmentary, vertical sectional view, taken along the line 17—17 of FIG. 16;

FIG. 18 is a view, similar to FIG. 16 and showing the component parts after their relative rotation has begun;

FIG. 19 is a fragmentary, vertical sectional view, taken along the line 19—19 of FIG. 18;

FIG. 20 is a view, similar to FIG. 16 and showing the component parts when the wiper blade is in its "Park" position;

FIG. 21 is an exploded view in perspective, showing the component parts of the second embodiment of the instant invention; and FIG. 22 is a diagrammatic view showing electrical circuitry for a mechanism embodying the invention.

Briefly, the invention relates to a windshield wiper drive mechanism for a windshield wiper blade. The wiper mechanism includes a reversible drive means which drives a rotatable member. The rotatable member is mounted for rotation on a fixed axis. A crank mechanism including a crankshaft is mounted on the rotatable member for rotative movement relative thereto on an axis which is parallel to and spaced from the fixed axis of rotation of the member. A crank arm is mounted on one end of the crankshaft. Releasable means are provided for connecting the crank mechanism to the rotatable member for rotation therewith and consequent rotation of the crank arm with a certain radial throw for oscillating the blade through a normal wiping sector. Release means are provided which are operable upon reversal of the direction of rotation of the rotatable member for actuating the releasable means for disconnecting the crank mechanism from the rotatable member, for restraining the crank mechanism against rotation with the rotatable member during continued rotation of the rotatable member in reverse direction and for providing relative rotation of the rotatable member and the crank mechanism. The relative rotation moves the crank arm radially outwardly relative to the fixed axis of the rotatable member for increasing its throw and moving the blade to an extreme "Park" position, beyond the normal wiping sector, thus effecting stripless parking because the blade makes one clean sweep from top to bottom before parking.

Figure 1:
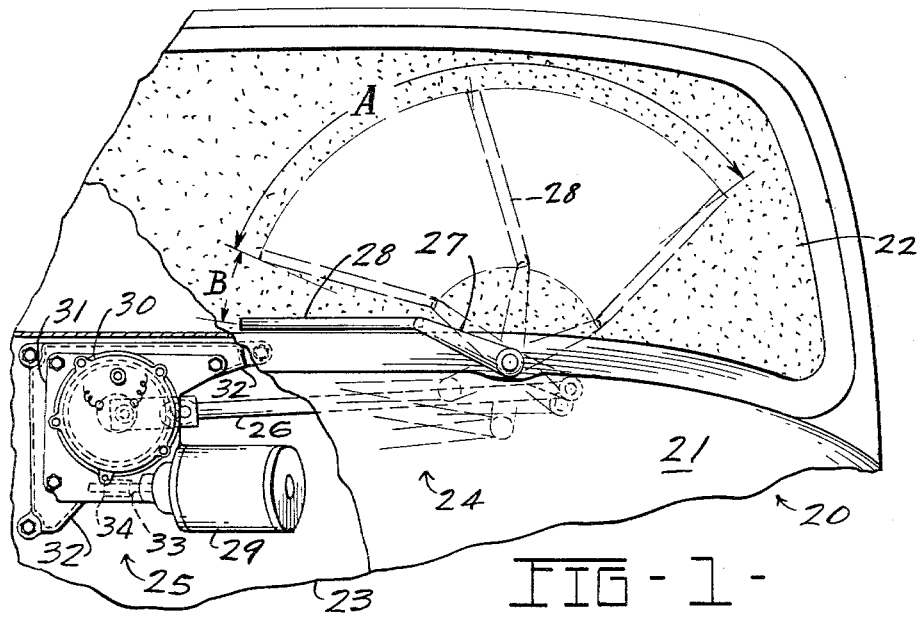
FIG. 1 is a fragmentary, front elevational view of the windshield of an automobile and showing a windshield wiper mechanism embodying the instant invention installed therein.

Referring to FIG. 1, an automotive vehicle is generally indicated by the reference numeral 20. The vehicle 20 includes a hood 21, a windshield 22 and a fire wall 23. A windshield wiper assembly is generally indicated by the reference numeral 24 and includes wiper drive mechanism 25, a connecting link 26, a wiper arm 27 and a wiper blade 28. While only one wiper blade 28 and link 26 are shown, a second wiper blade and link usually are provided; the link therefor being connected to the mechanism 25 in the same manner as the link 26 and the second wiper blade being mounted similarly to the blade 28.

The drive mechanism 25 includes a reversible motor 29, usually electric, and a cylindrical housing 30 both of which are mounted on a base 31. Other reversible drive means may be used, for example, a uni-directional motor with mechanical reversing linkage. The base 31 is mounted on an offset platform 32 (see FIG. 1) which is secured directly to the fire wall 23. In the alternative, the base 31 may be mounted directly on the fire wall 23. The offset platform 32 allows the connecting linkage 26 to move freely without interference from the fire wall 23 and associated appurtenances.

During a normal wiping operation, the wiper blade 28 oscillates through a normal operating sector designated by the arcuate arrow "A" in FIG. 1. When a vehicle operator turns the windshield wiper switch to an "Off" position, the wiper blade 28 moves to an extreme or "Park" position which is located beyond the normal wiping sector, the extra distance being indicated by the shorter arcuate arrow "B" in FIG. 1 and the wiper blade 28 being shown in solid lines in that position. The wiper arm 27 is pivotally mounted near its center on the vehicle 20 at a point below the windshield 22. The lower end of the wiper arm 27 is pivotally connected to the link 26 and the wiping sector of the wiper blade 28 is dependent upon the throw of the connecting link 26. While the wiper arm 27 has been illustrated as being mounted by a pivot connection, any of the well known wiper arm mechanisms are suitable for use with the windshield drive mechanism disclosed in this specification and the instant invention is not limited to the simple pivot mechanism disclosed in FIG. 1.

The reversible electric motor 29 has a shaft 33 (FIG. 3) which mounts a worm 34. A bore 35 of the housing 30 rotatably journals a worm gear 36 (FIGS. 3 and 5) which has an integral hub 37 and is positively driven by the worm 34. Referring to FIG. 5, the gear 36 functions as the motor driven rotatable member and rotates in the bore 35 around a fixed axis of rotation designated by the reference numeral 38. A longitudinally extending bore 39, having an eccentric axis 40 which is parallel to and spaced from the fixed axis 38 is formed in the gear 36 and hub 37. The worm gear 36 has an outer face 41 in which there is a pin recess 42.

A crank mechanism is generally indicated by the reference numeral 43 (see FIG. 6) and includes a crankshaft 44 having a first end 45 and a second end 46. A crank arm 47 is secured to the first end 45 of the crankshaft 44 and a U-shaped arm 48 is secured to the second end 46 of the crankshaft 44. A free end 49 of the crank arm 47 carries a crank pin 50 which in turn pivotally mounts an end 51 of the connecting link 26.

The crankshaft 44 is rotatably journaled within the bore 39 of the gear or rotatable member 36. The arm 48 has depending legs 52 and 53. A pair of aligned openings 54 and 55 are formed in the legs 52 and 53, respectively, for the reception of a locking pin 56 (see also FIG. 12) having an enlarged head 57. The head 57 has a flat 58 which slides on a flat portion 59 of the opening 54 to prevent rotation of the locking pin 56 in the openings 54 and 55. A spring 60 (FIGS. 3 and 10) biases the locking pin 56 toward the worm gear 36 and into recess 42 for releasably connecting the crank mechanism 43 to the gear 36. The locking pin 56 has an angular slot 61 in its upper surface, the purpose of which will be explained in detail below.

A cam plate 62, having an arcuate engager 63 mounted on its outer surface, is carried by the depending leg 53 of the arm 48. A hub 64 and a projection 65 extend from the inner surface 66 of the plate 62 and are radially spaced from one another, being engaged in openings 67 and 68 in the depending leg 53 so that the cam plate 62 rotates with the arm 48.

A cover plate 70 having an outer surface 71 and an inner surface 72 is mounted on the front, open end, of the housing 30. A rocker 73 is pivotally mounted by a shouldered rivet 74 set in the cover plate 70 on an axis which is parallel to and spaced from the fixed axis 38. A spring 75 is positioned between the inner surface 72 of the cover plate 70 and the rocker 73 to hold the rocker 73 in static positions until it is moved by the engager 63 as will be described below.

Referring to FIGS. 3 and 11, a switch actuating post 76 extends outwardly from the plate 62 to a point adjacent the inner surface 72 of the cover plate 70. During movement of the blade 28 through the normal wiping sector A, the post 76 rotates around the fixed axis 38 of the rotatable member 36. However, during relative rotation between the crank mechanism 43 and the rotatable member 36, the post 76 moves radially outwardly and finally opens a switch 77 (FIG. 7) which is mounted on the inner surface 72 of the cover plate 70.

The electrical circuitry is shown diagrammatically in FIG. 22. All of the switching operations are manually controlled by the driver with the exception of the switch 77 which is actuated by movement of the switch post 76 to finally turn off the mechanism.

A conventional windshield wiper switch (not shown) having an "Off" position, and two "On" positions is manually controlled by the vehicle operator. When the operator turns his windshield wipers to the first "On" position, a "forward-slow" circuit is established.

The "forward-slow" circuit comprises a power source, for example, a battery 80 which has a first grounded terminal and a second terminal which is connected through a contact 81 to a conductor 82 and to an associated open contact 83 to conductor 84. The conductor 82 is connected one side of an armature 85 of the motor 29 and the second side of the armature 85 is grounded. A branch circuit 86 connects the conductor 82 to a first side of a field coil 87 of the motor 29 and the second side of the field coil 87 is connected through a contact 88 to ground. This circuit is a full field circuit and the direct current shunt motor 29 operates at its full field speed.

When the operator turns the windshield wiper operating switch to its second "On" position a "forward-fast" circuit is actuated. A contact 89 in the circuit 86 is opened and a contact 90 from the conductor 82 is closed. This places a resistor 91 in series with the field coil 87 and the direct current shunt motor 29 operates at an increased speed thereby oscillating the wiper blade 28 at a greater speed.

When the operator turns the windshield wiper control switch to its "Off" position it actuates a "reverse" circuit. The contact 81 is opened and the contact 83 is closed whereby power is directed through the conductor 84 which is connected to the switch 77 which is mounted on the cover plate 70 and controlled by movement of the switch post 76. A conductor 92 extends from the switch 77 to the conductor 82 which in turn is connected to the armature 85. Simultaneously, the contact 88 leading to ground, a contact 93 in the circuit 86 and a contact 94 in the conductor 82 are opened. A contact 95 in a branch line 96 between the second side of the field coil 87 and the conductor 82 is closed as is a contact 97 which is in a circuit 98 leading from the circuit 86 to ground. When the contact 95 closes, a circuit is established from the conductor 92 through the contact 95, the field coil 87, through part of the circuit 86, and through the circuit 98 to ground. Reversal of the polarity of the field coil 87 causes the motor 29 to rotate in a reverse direction. After a predetermined length of time, as will be explained in detail below, the switch 77 is opened and the motor 29 is deactivated.

Figure 2:
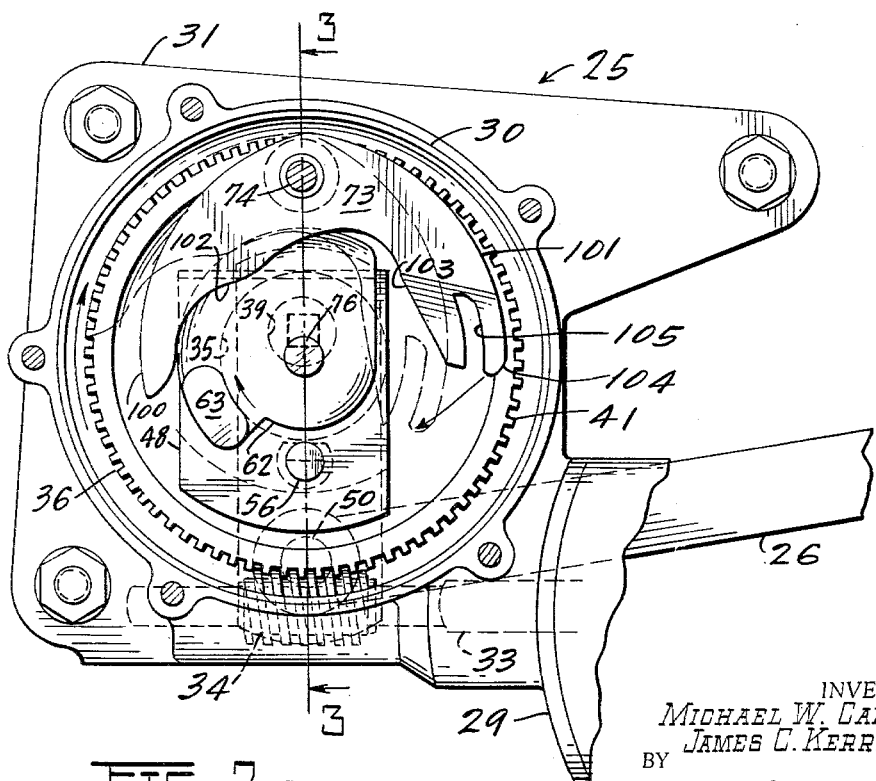
FIG. 2 is a fragmentary front elevational view of a windshield wiper drive mechanism according to the instant invention, with the cover plate removed and showing the mechanism in a position where the wiper blade is intermediate the extreme of its normal wiping sector.

Referring to FIGS. 2 and 3 when the windshield wiper blade 28 is oscillating through the normal wiping sector A the worm 34 rotates the gear or rotatable member 36 in a clockwise direction indicated by the arrow in FIG. 2. When the blade 28 is moving through a normal wiping sector, the locking pin 56 is engaged in the recess 42 of the gear 36 and serves as a releasable means for connecting the crank mechanism 43 to the gear or driven member 36 whereby the driven member 36 and the crank mechanism 43 rotate together.

The rocker 73 is generally "U-shaped" having a first arm 100 and a second arm 101. The rocker arm 73 pivots on an axis parallel to and spaced from the fixed axis 38 of the rotatable member 36 with the arms 100 and 101 extending on opposite sides of the axis. The first arm 100 has an inwardly protruding cam surface 102 on its inner edge and, in like manner, the second arm 101 has a cam surface 103 on its inner edge. An end 104 of the second arm 101 is bent inwardly toward the gear 36 and is bifurcated to form a slot 105.

When the gear or rotatable member 36 and the crank mechanism 43 including the cam plate 62 are rotating together in a clockwise (FIG. 2) or forward direction, the driver or engager 63 first contacts the cam surface 102 of the first arm 100 and swings the rocker arm 73 to move the second arm 101 inwardly to a position where it is aligned with and could engage the pin 56. It will be noted, that the engager 63 leads the locking pin 56 during forward rotation. During continued rotation of the gear 36 and the crank mechanism 43, the engager 63 contacts the cam surface 103 of the second arm 101 and swings the second arm 101 out of pin engaging position. Of course, this occurs before engagement could take place.

When the operator turns the windshield wiper switch to its "Off" position, actuating the reverse circuit described above, the rotatable member or gear 36 and the crank mechanism 43 begins to rotate in a counterclockwise or reverse direction (see FIGS. 8 and 9).

If, at the time of reversal, the engager 63 is in the lower portion of its travel between the cam surfaces 103 and 102 (for example, the position of FIG. 2) the just previous engagement of the engager with the surface 103 has swung the end 104 of the rocker arm out of pin engaging position. The engager 63 then passes the cam surface 103 and engages the cam surface 102 which swings the end 104 into pin engaging position. On the other hand, if the engager 63 is in the upper part of its path between the cam surfaces 102 and 103 as shown in FIG. 8, the just previous engagement with the cam surface 102 has swung the end 104 inwardly into pin engaging position and the engager passes the cam surface 102 without engagement soon after it is reversed, leaving the end 104 in pin engaging position. In either case, because the pin 56 leads the engager in reverse direction, the pin 56 will be captured by the end 104 of the arm 101. This arrangement, i.e., the pin 56 location at reversal with respect to the blade 28 location, determines that the blade goes to its outward position to make a clean sweep down to remove the strip left during the reversal movement.

As the rotatable member or gear 36 continues its rotation in a reverse direction, the bifurcated angled end 104 engages in the slot 61 of the locking pin 56. Continued rotation moves the locking pin 56 up the slot 105 and into the position shown in FIG. 9 pulling the pin 56 out of the recess 42 in the gear 36 (see FIG. 10). When the locking pin 56 is removed from the recess 42, the crank mechanism 43 is disconnected from the rotatable member or gear 36. The rocker 73 holds the locking pin 56 and restrains the crank mechanism 43 against rotation during continued rotation of the gear 36 in the reverse direction. During further rotation of the gear 36 in the reverse direction, because the crank mechanism is thus restrained against rotation, relative rotation occurs between the rotatable member or gear 36 and the crank mechanism 43 during which the eccentric axis 40 (referring to FIG. 9) is moved from its normal wiping position designated in FIG. 9 by the reference numeral 40A to a "Park" position wherein the eccentric axis is designated by the reference numeral 40B. During movement of the eccentric axis the crank arm 47 is moved radially outwardly with respect to the fixed axis 38 of the rotatable member 36. This movement increases the throw of the connecting link 26 and the wiper blade 28 is moved to an extreme position beyond the normal wiping sector A to its "Park" position designated by the solid lines in FIG. 1.

After the locking pin 56 has been engaged by the rocker 73 and disengaged from the recess 42 in the gear 36, the gear 36 continues to rotate through a predetermined angle of rotation which is approximately 180°. During relative movement of the crank mechanism 43 and the gear 36, the switch actuating post 76, which is an integral part of the crank mechanism 43, is also being moved in an arcuate path as shown in FIG. 7. After the completion of the predetermined angle of rotation of the gear 36, the post 76 engages and opens the switch 77. As was previously explained, this opening of the switch 77 disconnects the power source from the motor 29 and stops the motor 29.

When the operator again turns the windshield wiper switch to an "On" position, the switch 77 is still in an open position, however, the switch 77 is not in the forward circuitry and the motor 29 is immediately actuated and the gear 36 begins to rotate in a clockwise or forward direction. As the gear 36 rotates in its forward direction the rocker arm 73 continues to hold the locking pin 56 and the eccentric axis is moved from 40B to 40A (see FIG. 9). The switch post 76 is also returned to its main position and is disengaged from the switch 77 thereby closing the switch 77. As the recess 42 of the gear 36 indexes with the head 57 of the locking pin 56, the spring 60 urges the locking pin 56 into the recess 42 in the gear 36. Continued forward rotation of the rotatable member or gear 36 pulls the locking pin 56 from the slot 105 of the second arm 101 of the rocker 73. The locking pin 56 is disengaged from the rocker 73 and is again engaged in the recess 42 of the gear 36 as shown in FIG. 3. When this occurs, the crank mechanism 43 is again connected to the gear or rotatable member 36 and the crank mechanism 47 rotates with the gear 36 to oscillate the wiper blade through its normal operating cycle.

FIGS. 13 through 21 disclose a second embodiment of the instant invention. In this embodiment a rotatable member or gear 36a having a hub 37a is rotatably journaled in the bore 35 of the housing 30 and rotates around the fixed axis 38. The gear 36a and the hub 37a have a longitudinal bore 39a extending therethrough.

The gear 36a (see FIG. 21) has a recessed outer face 110 having a planar bottom 111. A raised generally circular disc 112 is integrally formed with the gear 36a and surrounds the bore 39a. The disc 112 has a drive recess 113 on its edge and an axially and radially protruding drive projection 114. An engager lug 115 having a first edge 116 and a second edge 117 is integrally formed on the rim of the gear 36a and extends into the recess 110. Similarly, a disengager lug 118 is integrally formed on bottom 111 of the recess 110 in the gear 36a at a location which is generally diametrically opposite to the lug 115. A guide 119 is integrally formed on the bottom 111 at a position intermediate the engager lug 115 and the disengager lug 118.

A crank mechanism generally indicated by the reference numeral 43a includes a crankshaft 44a which is rotatably mounted in the bore 39a of the rotatable member 36a and the hub 37a. The crankshaft 44a has a first end 45a and a second end 46a. The crank arm 47 (FIG. 14) is mounted on the first end 45a and a plate 120 (FIG. 21) is mounted on the second end 46a of the crankshaft 44a. A drive projection 121 extends outwardly from the periphery of the plate 120. The plate 120 has a generally V-shaped recess 122 in its edge. A pawl 123 is pivotally mounted on the plate 120 at a point adjacent the recess 122 by a rivet 124 or similar means. The pawl 123 has a hook recess 125 which has a narrow mouth 126, a back edge 127 and a front edge 128. A circular plate 62a having a switch post 76a projecting outwardly therefrom is secured to the plate 120 by the rivet 124 and rotates therewith. The pawl 123 also has a dog 129 which is engageable in the recess 122 of the plate 120.

A rocker 73a is pivotally mounted adjacent the inner surface 72 of the cover plate 70 on an axis which is spaced from and parallel to the fixed axis 38. The rocker 73a has an inwardly directed hook 130 suitable for engagement in the hook recess 125 of the pawl 123.

Referring to FIGS. 13 and 14, when the windshield wiper blade 28 is oscillating through the normal wiping sector A the gear or rotatable member 36a is rotating in a clockwise or forward direction indicated by the arrow in FIG. 13. The drive projection 114 engages the back side of the drive projection 121 to drive the crank mechanism 43a with the gear 36a. The dog 129 of the pawl 123 extends inwardly through the V-shaped recess 122 of the plate 120 and is engaged in the drive recess 113 of the rotatable member 36a. This engagement releasably connects the crank mechanism 43a directly to the rotatable member or gear 36a. The spacing and the circumferential location of the eccentric axis 40 with respect to the fixed axis 38 determines the throw of the connecting link 26.

As the gear 36a rotates in its forward or clockwise direction the second edge 117 of the engager lug 115 strikes the hook 130 of the rocker 73a and moves the rocker 73a inwardly into a "hook" engaging position. Subsequently, during continued forward rotation of the gear 36a the disengager lug 118 strikes the hook 130 of the rocker 73a and moves the rocker 73a outwardly, out of "hook" engaging position.

When the vehicle operator turns the windshield wiper switch to its "Off" position, actuating the reverse circuit, the rotatable member or gear 36a and the crank mechanism 43a begin to rotate in a counterclockwise or reverse direction (see FIGS. 15-20). If the hook 130 of the rocker 73a is not already swung inwardly into a hook receiving position, the first edge 116 of the engager lug 115 strikes the hook 130 and moves it into the hook engaging position. As the rotatable member 36a continues its rotation in the reverse direction, the guide 119 leads the hook 130 of the rocker 73a into the mouth 126 of the hook recess 125 in the pawl 123. The hook 130 engages the back edge 127 of the hook recess 125 and continued reverse rotation of the rotatable member 36a pivots the pawl 123 (see FIGS. 18 and 20). As the pawl 123 is pivoted, the dog 129 moves out of the drive recess 113 of the gear 36a and the gear 36a is disconnected from the crank mechanism 43a. The crank mechanism 43a is restrained from rotation during the continued rotation of the gear 36a and relative rotation occurs between the gear 36a and the crank mechanism 43a whereby the eccentric axis 40 is moved with respect to the fixed axis 38 of the gear 36a. The crank arm 47 is moved radially outwardly with respect to the fixed axis 38 of the member 36a and the effective radius of the crank arm 47 is increased. This movement increases the throw of the connecting link 26 and the wiper blade 28 is moved to the extreme "Park" position beyond the normal wiping sector A. Simultaneously, the switch post 76a is also moved. Upon the completion of a predetermined angle of rotation of the member 36a the switch post 76a engages and opens the switch 77 stopping the motor 29, as shown in FIG. 15.

When the operator again turns the windshield wiper switch to an "On" position, a forward electrical circuit is actuated and the rotatable member 36a begins to rotate in a forward or clockwise direction. As the gear 36a continues to rotate in a forward direction the integral drive projection 114 of the gear 36a engages the drive projection 121 of the plate 120 and moves the plate 120 in a clockwise direction. During continued rotation the front edge 128 of the hook recess 125 strikes the hook 130 of the rocker 73a and the pawl 123 is pivoted. The dog 129 of the pawl 123 moves into the drive recess 113 of the gear 36a. When the pawl 123 has returned to the position shown in FIG. 16 the hook 130 of the rocker 73a indexes with the mouth 126 of the hook recess 125 and the hook 130 is moved out of the hook recess 125. During this operation the eccentric axis 40 is again moved with respect to the fixed axis 38 and the throw of the connecting link 26 is reduced whereby the wiper blade 28 is again oscillated through the normal wiping sector A. Similarly, the switch post 76a is also moved closing the switch 77 which is located in the reverse electrical circuit.

While the present invention has been disclosed with a specific arrangement and disposition of the parts, it should be expressly understood that numerous modifications and changes may be made without departing from the scope of the appended claims.

What we claim is:

1. A drive mechanism for a windshield wiper blade comprising, in combination, a reversible drive means, a rotatable member driven by said drive means and mounted for rotation on a fixed axis, a crank mechanism including a crankshaft that is mounted on said member for rotative movement relative thereto on an axis which is parallel to and spaced from said fixed axis of rotation of said member, and a crank arm on said crankshaft, releasable means for connecting said crank mechanism to said member for rotation therewith and consequent rotation of said crank arm with a certain radial throw for oscillating said blade through a normal wiping sector, and release means operable upon reversal of the direction of rotation of said member for actuating said releasable means for disconnecting said crank mechanism from said member, for restraining said crank mechanism against rotation during continued rotation of said member in reverse direction and for providing relative movement of said member and said crank mechanism for radially outwardly moving said crank arm relative to the fixed axis of said member for movement of said blade to an extreme position beyond the normal wiping sector, whereby said blade effects a continuous sweep of said normal wiping sector and said extreme position.

2. A drive mechanism according to claim 1 and means actuable upon the completion of a predetermined angle of rotation of said member in a reverse direction for deactivating said drive means and stopping the rotation of said member in such reverse direction.

3. A drive mechanism according to claim 1 in which said release means comprises a rocker element and at least one engaging element, one of said elements being rotatable with said member at least during forward rotation thereof and the other of said elements being mounted separately from said member, said rocker element being alternately movable into and out of position for actuating the releasable means prior to actuation thereof by successive engagements between said rocker and engaging elements during forward rotation of said member.

4. A drive mechanism according to claim 3 in which said releasable means consists of intergaging parts mounted on said member and said crank mechanism, respectively.

5. A drive mechanism for a windshield wiper blade comprising, in combination, a reversible drive means, a rotatable member driven by said drive means and mounted for rotation on a fixed axis, a crank mechanism including a crankshaft that is mounted on said member for rotative movement relative thereto on an axis which is parallel to and spaced from said fixed axis of rotation of said member and a crank arm on said crankshaft, releasable means for connecting said crank mechanism to said member for rotation therewith and consequent rotation of said crank arm with a certain radial throw for oscillating said blade through a normal wiping sector, and release means operable upon reversal of the direction of rotation of said member for actuating said releasable means for disconnecting said crank mechanism from said member, for restraining said crank mechanism against rotation during continued rotation of said member in reverse direction and for providing relative rotation of said member and said crank mechanism for radially outwardly moving said crank arm relative to the fixed axis of said member for movement of said blade to an extreme position beyond the normal wiping sector, said release means comprising a rocker pivoted on an axis parallel to and spaced from the axis of rotation of said member, rotatable engaging means for moving said rocker into and out of position for actuating said releasable means during forward rotation of said rotatable member and for moving said rocker into such position during reverse rotation of said rotatable member, and means on said rocker operable to release said releasable means upon engagement therewith during reverse direction of rotation of said rotatable member.

6. A drive mechanism according to claim 1 in which said release means comprises a generally U-shaped two-armed rocker pivoted on an axis parallel to and spaced from the axis of rotation of said member with the arms of said rocker extending on opposite sides of such axis, and an engager mounted for rotation with said crank mechanism the inner edges of the arms of said rocker being contoured and spaced and engagement of said engager during forward rotation of said member with a first arm of said rocker swings said rocker into position for actuating the releasable means and subsequent engagement of said engager with the other arm of said rocker swings said rocker out of such position prior to actuation of said releasable means, one of said arms being operable to release said releasable means upon engagement therewith during reverse direction of rotation of said rotatable member.

7. A drive mechanism for a windshield wiper blade comprising, in combination, a reversible electric motor, a rotatable member driven by said motor and mounted for rotation on a fixed axis, said rotatable member defining a pin recess, a hub having a longitudinally extending bore therethrough on said rotatable member, such bore having an axis which is parallel to and spaced from said fixed axis of rotation of said member, a crank mechanism including a crankshaft journaled within such bore, a crank arm mounted on one end of said crankshaft, and an arm mounted on the other end of said crankshaft, a locking pin supported by said arm and releasably positioned within such recess for connecting said crank mechanism to said member for rotation therewith and consequent rotation of said crank arm with a certain radial throw for oscillating said blade through a normal wiping sector, a generally U-shaped, two-armed rocker pivoted on an axis parallel to and spaced from the axis of rotation of said member with the arms of said rocker extending on opposite sides of such axis, one of said rocker arms having a pin engaging portion, and an engager mounted for rotation with said arm, the inner edges of said arms of said rocker being contoured and spaced such that engagement of said engager during forward rotation of said member with a first arm of said rocker swings said rocker into a pin engaging position and subsequent engagement of said engager with the other arm of said rocker swings said rocker out of said pin engaging position prior to engagement by said pin engaging portion, said pin engaging portion of said rocker being operable upon reversal of the direction of rotation of said member to remove said locking pin from such recess whereby said crank mechanism is disconnected from said member, said crank mechanism being restrained from rotation during continued rotation of said member in reverse direction, and relative rotation of said member and said crank mechanism moves said crank arm radially outwardly relative to the fixed axis of said member for movement of said blade to an extreme position beyond the normal wiping sector.

8. A drive mechanism according to claim 1 in which said release means comprises a rocker pivoted on an axis parallel to and spaced from the axis of rotation of said member, engaging means mounted for rotation with said member for swinging said rocker into position for actuating the releasable means during forward rotation of said member and for swinging said rocker arm out of such position prior to actuation of said releasable means during subsequent forward rotation of said member, said rocker being operable to release said releasable means upon engagement therewith during reverse direction of rotation of said rotatable member.

9. A drive mechanism for a windshield wiper blade, comprising, in combination, a reversible electric motor, a rotatable member driven by said motor and mounted for rotation on a fixed axis, said rotatable member defining a drive recess and a bore, such bore having an axis which is parallel to and spaced from said fixed axis of rotation of said member, a crank mechanism including a crankshaft journaled in such bore, a crank arm mounted on one end of said crankshaft, a member pivotally mounted on the other end of said crankshaft, said member having means releasably positioned within such drive recess for connecting said crank mechanism to said member for rotation therewith and consequent rotation of said crank arm with a certain radial throw for oscillating said blade through a normal wiping sector, a rocker pivoted on an axis parallel to and spaced from the axis of rotation of said member, engaging means mounted for rotation with said rotatable member for swinging said rocker into position for engaging said member during forward rotation of said member, and for swinging said rocker out of such position prior to contact with said member during continued forward rotation of said member, said rocker being operable upon reversal of the direction of rotation of said member to disengage said member means from such drive recess, means for restraining said crank mechanism from rotation during continued rotation of said member in reverse direction, whereby said crank mechanism is disconnected from said member and relative rotation of said members and said crank mechanism moves said crank arm radially outwardly relative to the fixed axis of said member for movement of said blade to an extreme position beyond the normal wiping sector.

References Cited by the Examiner
UNITED STATES PATENTS 2,779,199   1/1957   Lincoln _____ 15—250.17 X
2,959,968   11/1960  Gute et al. _____ 15—250.17 X CHARLES A. WILLMUTH, *Primary Examiner.*